United States Patent
Antony et al.

(10) Patent No.: US 10,579,403 B2
(45) Date of Patent: Mar. 3, 2020

(54) POLICY BASED PROVISIONING OF CONTAINERS

(71) Applicant: VMWARE, INC., Palo Alto, CA (US)

(72) Inventors: Jinto Antony, Bangalore (IN); Hariharan Jeyaraman Ganesan, Bangalore (IN); Saju Chengat, Bangalore (IN); Madhusudhanan Gangadharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 199 days.

(21) Appl. No.: 14/859,378

(22) Filed: Sep. 21, 2015

(65) Prior Publication Data

US 2016/0378518 A1 Dec. 29, 2016

(30) Foreign Application Priority Data

Jun. 29, 2015 (IN) .............................. 3275/CHE/2015

(51) Int. Cl.
*G06F 9/455* (2018.01)
*G06F 9/48* (2006.01)
*G06F 9/50* (2006.01)

(52) U.S. Cl.
CPC ...... *G06F 9/45533* (2013.01); *G06F 9/45558* (2013.01); *G06F 9/4856* (2013.01); *G06F 9/5077* (2013.01); *G06F 2009/45595* (2013.01)

(58) Field of Classification Search
CPC ............. G06F 9/45533; G06F 9/45558; G06F 9/4856; G06F 9/5077; G06F 2009/45595
See application file for complete search history.

(56) References Cited

U.S. PATENT DOCUMENTS

| | | | |
|---|---|---|---|
| 7,577,722 B1 * | 8/2009 | Khandekar | G06F 9/45558 709/220 |
| 8,171,201 B1 * | 5/2012 | Edwards, Sr. | G06F 9/45558 711/112 |
| 2009/0327781 A1 * | 12/2009 | Tripathi | G06F 9/4818 713/324 |

(Continued)

OTHER PUBLICATIONS

Li et al. Leveraging Linux Containers to Achieve High Availability for Cloud Services. [online] (Mar. 13, 2015). IEEE., pp. 1-8. Retrieved From the Internet <http://www8.cs.umu.se/~viali/papers/ic2e2015.pdf>.*

(Continued)

*Primary Examiner* — Emerson C Puente
*Assistant Examiner* — Jonathan R Labud
(74) *Attorney, Agent, or Firm* — Loza & Loza, LLP

(57) ABSTRACT

Techniques for placing containers in a cloud (e.g., into virtual machines ("VMs")) based on container policies. The container policies may specify compute-related qualities, storage-related quality, and/or network-related qualities that are to be met by the underlying software and hardware that supports execution of the virtual machines. A cloud director or other entity receives requests to place containers in a particular virtual machine based on the container policies and directs placement of the virtual machine based on the policies. The cloud director may migrate and/or reconfigure VMs, virtual machine disk files, and/or virtual network interface controllers to satisfy the container placement policy. After placement, the cloud director may disable migration to maintain the VM in a desired state.

20 Claims, 4 Drawing Sheets

(56) References Cited

U.S. PATENT DOCUMENTS

| | | | | |
|---|---|---|---|---|
| 2013/0074066 A1* | 3/2013 | Sanzgiri | ............... | H04L 49/70 718/1 |
| 2013/0262643 A1* | 10/2013 | Anderson | ............... | G06F 8/60 709/223 |
| 2016/0092252 A1* | 3/2016 | Wagner | ............... | G06F 9/45533 718/1 |

OTHER PUBLICATIONS

Piraghaj et al. ContainerCloudSim: An Environment for Modeling and Simulation of Containers in Cloud Data Centers. [online] (2010). Wiley., pp. 1-17. Retrieved From the Internet <http://www.cloudbus.org/papers/ContainerCloudSim.pdf>.*

"VMware + Containers = Containers without Compromise" available at: http://blogs.vmware.com/cto/vmware-containers-containers-without-compromise/.

"SPBM" available at:http://pubs.vmware.com/vsphere-55/index.jsp?topic=%2Fcom.vmware.vsphere.storage.doc%2FGUIDC8E919D0-9D80-4AE1-826B-D180632775F3.html.

* cited by examiner

POLICY BASED PROVISIONING OF CONTAINERS

RELATED APPLICATIONS

Benefit is claimed under 35 U.S.C. 119(a)-(d) to Foreign application Serial No. 3275/CHE/2015 filed in India entitled "POLICY BASED PROVISIONING OF CONTAINERS", on Jun. 29, 2015, by VMware, Inc., which is herein incorporated in its entirety by reference for all purposes.

BACKGROUND

Recently, the use of application containers has become an increasingly popular way of executing applications on a host computer. A container provides for the isolation of a group of processes from the others on an operating system. By making use of existing operating system functionality (such as Linux name spaces), containers maintain their own private view of the operating system, file system structure, and network interfaces. Containers share the operating system kernel with other processes in that the operating system supports execution of multiple containers as separate processes. However, containers can be constrained to some extent to use an amount of resources such as the central processing unit (CPU), random access memory (RAM), or input/output (I/O) devices. Containers have proven advantageous because they typically have a small system "footprint." That is, containers provide a relatively thin encapsulation layer above and beyond any applications contained therein. Thus, instantiation and deployment of containers is relatively quick.

Presently, when a user requests that a new container be provisioned, there is no way for the user to select operational characteristics of the underlying platform upon which requested container will be executed. However, users may wish to specify various aspects of such a platform.

SUMMARY

Embodiments of the present disclosure provide a system, computer-readable storage medium having instructions, and a method, for placing a container within a virtualized computing environment. The method includes provisioning a container in a virtual machine (VM) based on compute policies included in container placement policies. The method also includes identifying a virtual machine disk file (VMDK) for the VM based on storage policies included in the container placement policies. The method further includes identifying a virtual network interface controller (vNIC) for the VM based on network policies included in the container placement policies.

The system includes a cloud director, a plurality of hosts executing a plurality of virtual machines (VMs), and a plurality of network devices supporting a plurality of virtual network interface controllers (vNICs). The cloud director is configured to provision a container in a VM of the plurality of VMs based on compute policies included in container placement policies. The cloud director is also configured to identify a VMDK of the plurality of VMDKs for the VM based on storage policies included in the container placement policies. The cloud director is further configured to identify a vNIC of the plurality of vNICs for the VM based on network policies included in the container placement policies.

A non-transitory computer-readable medium storing instructions that, when executed by a processor, cause the processor to perform a method. The method includes provisioning a container in a virtual machine (VM) based on compute policies included in container placement policies. The method also includes identifying a virtual machine disk file (VMDK) for the VM based on storage policies included in the container placement policies. The method further includes identifying a virtual network interface controller (vNIC) for the VM based on network policies included in the container placement policies.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
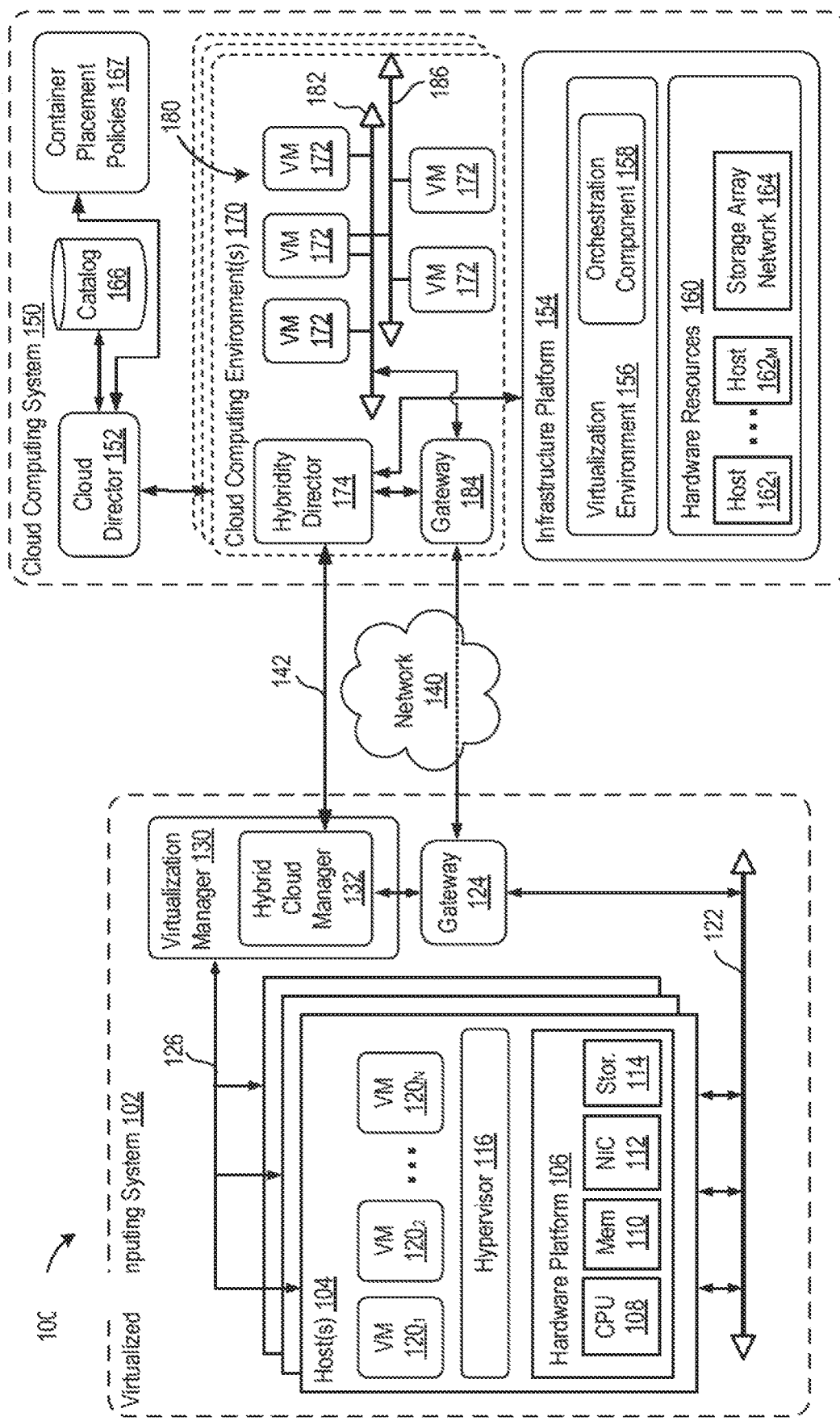
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as an off-premise data center(s). In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other devices such as for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (MC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, may nm in a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120, route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that usage of any other virtualization technologies, including Xen® and Microsoft Hyper-V virtualization technologies is consistent with the teachings herein).

In one embodiment, cloud computing system 150 may include a cloud director 152 (which may be embodied as software running in one or more virtual machines or outside of Virtual machines) that manages allocation of virtual computing resources to an enterprise for deploying applications. Cloud director 152 may be accessible to Users via a REST (Representational State Transfer) API (Application Programming Interface) or an other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMS 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs and hosts 162 of cloud computing system 150 via infrastructure platform 154.

The various components of hardware platform 106 may differ across different host computer systems 104. For example, the processor in one host computer system 104 may belong to the Intel family of processors while the processor in a different host computer system 104 may belong to the AMD family of processors. Processors 108 may also differ in other ways, such as processor speed, architecture bit size, and in other ways.

Container Provisioning within the Hybrid Cloud Computing System

In addition to provisioning and managing VMs 120 and VMs 172, hybrid cloud computing system 100 may also provision and manage containers within VMs 120 and/or VMs 172. Containers are software instances that enable virtualization at the operating system level. That is, with containerization, the kernel of an operating system that manages a host computer is configured to provide multiple isolated user space instances. These instances, referred to as containers, appear as unique servers from the standpoint of an end user that communicates with the containers. However, from the standpoint of the operating system that manages the host computer on which the containers execute, the containers are user processes that are scheduled and dispatched by the operating system. Examples of a container daemon include the open-source Docker platform made available by Docker, Inc. and Linux Containers (LXC). When executed within a virtual machine such as VM 172, containers may be referred to herein as "virtual containers."

Virtualization manager 130 may receive a request from a user to provision a container within a VM 120, and in response, may provision a container within a VM 120 in virtualized computing system 102. Similarly, cloud director 152 may receive a request from a user to provision a container within a VM 172 and may direct orchestration component 158 within infrastructure platform 154 to provision a container. Hybrid cloud manager 132 may, upon receiving a request to provision a container from a user, direct cloud computing system 150 to provision a container in a VM 172, via hybridity director 174.

Figure 2:
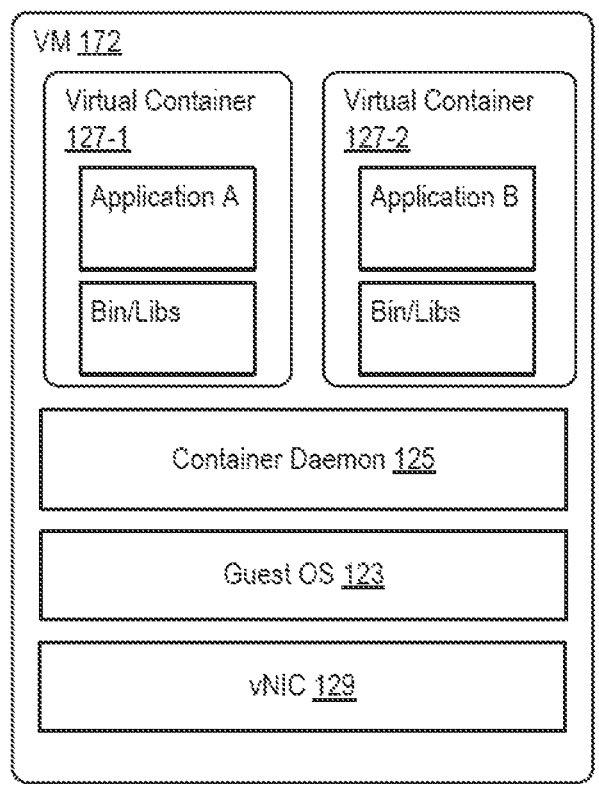
FIG. 2 is a block diagram that illustrates a virtual machine configured to execute containers, according to an embodiment.

FIG. 2 is a block diagram that illustrates a VM 172 configured to execute containers 127, according to an embodiment. As shown, VM 172 includes virtual hardware 190, including virtual CPU 191 ("vCPU"), virtual memory 192, virtual network interface controller ("vNIC") virtual memory 192 ("vMem"), and virtual storage 194 ("vStor") supporting execution of a guest operating system 123, container daemon 125, and virtual containers 127. Note that although FIG. 2 illustrates VMs 172 that execute within cloud computing system 150, the description of containers provided herein apply to containers that execute within VMs 120 of virtualized computing system 102 as well. A VM 120 within virtualized computing system 102 into which containers are placed would have a similar composition as the VM 172 illustrated in FIG. 2 (e.g., may include a container daemon running virtual containers).

To manage virtual containers 127, VMs 172 include a container daemon 125 installed therein and running as a guest application under control of guest OS 123. Container daemon 125 is a process that enables the deployment and management of virtual containers by providing a layer of operating-system-level virtualization on guest OS 123 within VM 172.

In one or more embodiments, container daemon 125 is configured to utilize resource isolation features of guest OS 123 to permit multiple virtual containers 127 to run within a single virtual machine. For example, in cases where guest OS 123 includes a Linux™ kernel, container daemon 125 may use features such as kernel namespaces to isolate a container's view of guest OS 123, including process and user IDs, process trees, and mounted file systems, and the Control Groups (or "cgroups") feature to isolate a virtual CPU, virtual RAM, storage, and networking resources. In some embodiments, container daemon 125 executes system calls and requests operating system services and VM resources from guest OS 123. Guest OS 123 allocates virtual resources to container daemon 125, which correspond to physical computing resources (such as physical memory). The physical resources are allocated by a hypervisor that manages the execution of VM 172, as well as all other virtual machines executing within the particular host computer on which VM 172 runs.

In one embodiment, each VM 172 is configured to run one or more virtual containers 127 therein. A virtual container 127 may be instantiated on a VM by container daemon 125. Each virtual container 127 runs as an isolated process in userspace on guest OS 123, sharing the kernel of guest OS 123 with other virtual containers 127. Each virtual container 127 may be a package (sometimes referred to as an "image") of pre-installed application code and any binaries and libraries used for the execution of that application code to create a virtualized application. In some cases, virtual container 127 may be a blank image into which applications may be installed or launched within. As depicted in FIG. 2, VM 172 includes a first virtual container 127-1 having application code for Application A and its associated binaries and libraries, and a second virtual container 127-2 having application code for Application B and its associated binaries and libraries. Cloud director 152 may cooperate with orchestration component 158 to deploy new virtual containers 127, to update an already existing container 127, for example, by adding a new application to container 127, or to quiesce or destroy a container 127.

Container Placement Based on Policies

In past embodiments, a cloud computing system did not give control to a user regarding the hardware or software capabilities of a VM or host into which a virtual container is placed. Instead, when a user would request creation of a new virtual container, a cloud computing system would select a particular VM to execute the virtual container based on factors or policies that are not controllable by a user. Because users (e.g., administrators) may want control over various aspects of a VM into which a container is placed, techniques are provided herein to permit a user to specify container placement policies that allow selection of characteristics of the underlying hardware that ultimately supports the execution of a particular container.

Figure 3:
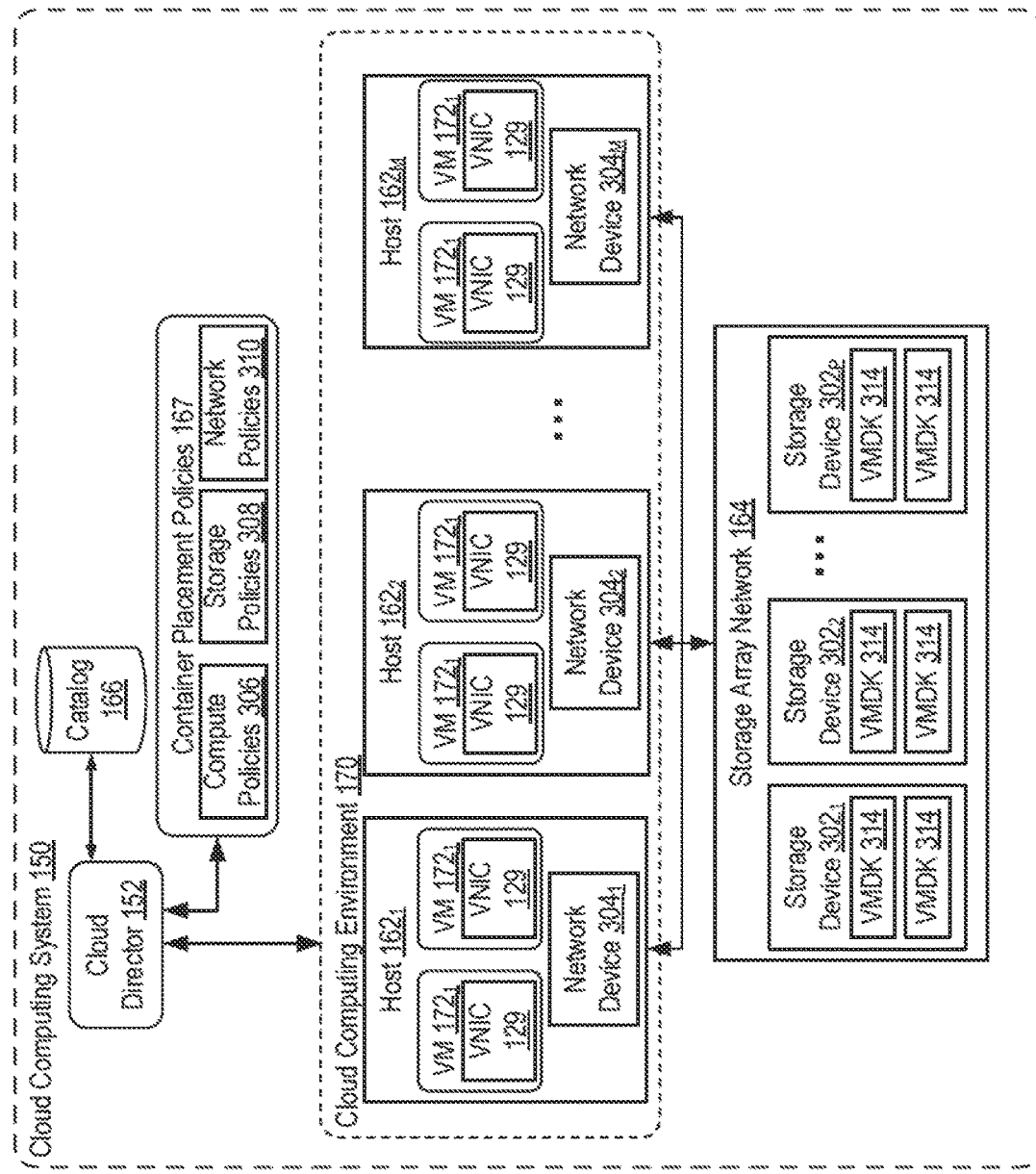
FIG. 3 illustrates the cloud computing system of FIG. 1 in further detail, according to an embodiment.

FIG. 3 illustrates cloud computing system 150 of FIG. 1 in further detail, according to an embodiment. To concisely illustrate operations associated with container placement, FIG. 3 shows parts of cloud computing system 150 but omits several items explicitly illustrated in FIG. 1, such as virtualized computing system 102, infrastructure platform 154, virtualization environment 156, and orchestration component 158. Cloud director 152 is shown in communication with cloud computing environment 170 which includes hosts 162 executing VMs 172. vNICs 129 supported by physical networking device 304 allow VMs 172 to communicate with objects on a network, including storage array network 164 which stores VMDKs 314 in storage devices 302.

It should be understood based at least on the content of and description related to FIG. 1 that cloud computing system 150 illustrated in FIG. 3 operates in the context of the hybrid cloud computing system 100 of FIG. 1. It should also be understood that although cloud computing system 150 is shown as an operating environment into which containers could be placed, containers may also be placed into VMS 120 executing within virtualized computing system 102. A user request to place a container may thus be serviced by cloud director 152, virtualization manager 130, and/or hybrid cloud manager 132. For simplicity, the example of container placement described below is described in the context of cloud computing system 150. Thus, cloud director 152 is described as handling requests for container placement. However, it should be understood that virtualization manager 130 and/or hybrid cloud manager 132 may handle such requests as well.

To provide user control for containers, when a user requests that a new container be provisioned, cloud director 152 selects or configures a VM 172, VMDK 314, and vNIC 129 to meet container placement policies 167, which are user-definable settings that allow for control over the underlying software and hardware into which a container is placed. Container placement policies 167 include compute policies 306, storage policies 308, and network policies 310. Compute policies 306 dictate compute-related characteristics of VM 172 into which the container is placed. Storage policies 308 dictate storage-related characteristics for physical storage device 302 and virtual machine disk file 314 ("VMDK," which is a file that stores information for and acts as non-volatile storage for a VM 172) that container 127 is to use. Network policies 310 dictate network-related characteristics to be provided to VM 172 into which the container is placed.

Container placement policies 167 may include different policies for different groups of containers. For example, container placement policies 167 may specify a first set of requirements for a first group of containers deemed to be part of container group A, a second set of requirements for a second group of containers deemed to be part of container group B, and so on. When a user requests provisioning of a new container, the user may specify a particular container group. Cloud director 152 then places the container based on the container policies associated with that container group.

In some embodiments, compute policies 306 include one or more of the following characteristics: a selection between on-premise and off-premise hardware, a host CPU "family" (e.g., manufacturer), type of controller for non-volatile storage included within the host (e.g., redundant array of inexpensive disks (RAID) or serial attached small computer system interface (serial attached SCSI or "SAS"), type of operating system executed by VM 172 that will execute container 127 (e.g., Windows, Linux, or a specific distribution of Linux such as CentOS or Red Hat), the VM hardware version, the number of virtual CPUs of the VM, whether high availability ("HA") is enabled, whether distributed resource scheduling ("DRS") is enabled, whether fault tolerance ("FT") is enabled, and the amount of RAM allocated to the VM. A more detailed description of these characteristics is provided below.

When a user requests placement of a container, cloud director 152 attempts to identify a VM 172 that meets compute policies 306 associated with the container. If cloud director 152 finds such a VM 172, then cloud director 152 causes that VM 172 to execute the requested container. If cloud director 152 finds a VM 172 that could meet compute policies 306 if migrated (i.e., moved) from one physical host 162 to another physical host, then cloud director 152 causes that VM 172 to be migrated, after which cloud director 152 places the requested container into the migrated VM. If no such VM exists, cloud director 152 finds a host 162 that meets the hardware-related compute policies (e.g., physical location of the host (on-versus off-premise), host CPU family, and the like) and provisions a new VM that meets the rest of compute policies 306 on that host 162. Subsequently, cloud director 152 provisions the requested container on that VM.

In some embodiments, a compute policy 306 may specify the selection between on-premise and off-premise hardware, which is a selection between executing container 127 in a VM 120 in virtualized computing system 102 (i.e., "on-premise execution") and executing container 127 in a VM 172 in cloud computing system 150 (i.e., "off-premise execution"). As described above, virtualized computing system 102 represents computing resources (e.g., hosts 104) managed by a particular organization and cloud computing system 150 represents computing resources managed by a different organization, such as the vendor of the virtualization software (e.g., virtualization manager 130, hypervisor 116, and the like), and said to be urn "in the cloud." Containers 127 may be placed into VMs 172 operating "in the cloud" (in cloud computing system 150) as well as into VMs 120 operating in virtualized computing system 102.

In some embodiments, a compute policy 306 may specify the host CPU family, which may include the manufacturer and/or type of the CPU of the host computer 162 into which container 127 is placed. The manufacturer may be, for example, Intel®, AMD®, or another manufacturer, and the type of the CPU may include, for example, Intel® Xeon® processor, with further subdivisions of type Optionally specified as well.

In some embodiments, a compute policy 306 may specify the type of controller for non-volatile storage included with the host, which specifies the type of storage device that is included in host 162 that is to execute container 127. Examples of controller types include RAID and SAS.

In some embodiments, a compute policy 306 may specify the operating system of the OS executed by VM 172 that will execute container 127, which specifies which operating system executes within VM 172 into which container 127 is placed. For various reasons, users may require a specific operating system to execute their containers 127. This compute policy allows selection of a specific operating system for execution of a container 127 by the user.

In some embodiments, a compute policy 306 may specify the VM hardware version, which refers to the hardware version of VM 172 into which container 127 will be placed. Different VM hardware versions may have different capabilities, hardware requirements, and the like, and users may choose different hardware versions for the VM that runs their containers 127.

In some embodiments, a compute policy 306 may specify the number of virtual CPUs of VM 172, which simply indicates how many virtualized or emulated CPUs are running in the VM into which container 127 will be placed.

In some embodiments, a compute policy 306 may specify the amount of RAM allocated, which is self-explanatory as well. The hypervisor on which VM 172 is running allocates a particular amount of RAM to each VM 172.

In some embodiments, a compute policy 306 may specify whether to place a container 127 in a VM 172 for which high availability ("HA") is enabled (or is not enabled). High availability is a technique in which backup hosts 162 perform failovers to take over execution of VMs 172 for which the underlying host has failed in some way. VMs 172 may be executing on hosts 162 for which HA is enabled or for which HA is not enabled.

In some embodiments, a compute policy 306 may specify whether to place a container 127 in a VM 172 for which distributed resource scheduling ("DRS") is enabled (or is not enabled). Distributed resource scheduling is a technique that dynamically balances computing capacity across multiple hosts 162. Among other features, DRS allows for setting priority of resources to particular tasks, for optimizing resource utilization, and for isolation of resources allocated to particular tasks. DRS can be enabled for any particular host 162.

In some embodiments, a compute policy 306 may specify whether to place a container 127 in a VM 172 for which fault tolerance ("FT") is enabled (or is not enabled). Fault tolerance is a feature that allows for a backup VM 172 to take over for a VM 172 that fails. FT is enabled on a per-VM basis.

Storage policies 308 dictate user-specified characteristics of storage resources (e.g., storage device 302) that are to store data (e.g., VMDK 314) for the requested container. Storage policies 308 include one or more of the following characteristics: a datastore identifier, a storage-RAID level, storage-de-duplication, storage-array based snapshot, VMDK type (e.g., thick, thin, or lazy-zeroed), and VMDK SCSI controller. More detailed descriptions of the above-mentioned characteristics are provided below.

After placing the requested container in a VM, cloud director 152 attempts to identify a VMDK 314 that is connected to the VM in which the container was placed and that meets storage policies 308 associated with the container. If cloud director 152 finds such a VMDK 314, then cloud director 152 causes the VM in which the container is placed to use that VMDK 314. If cloud director 152 finds a VMDK 314 that could meet storage policies 308 if migrated (i.e., moved) from one storage device 302 to another storage device 302, then cloud director 152 causes that VMDK 314 to be migrated (e.g., between datastores), after which cloud director 152 causes the requested VM into which the container is placed to use that VMDK 314. If no such VMDK 314 exists, cloud director 152 provisions a new VMDK and connects the new VMDK to the VM in Which the container is placed and that meets compute policies 306.

The datastore identifier is an identifier of a particular storage device 302. A datastore is a storage location for files for VM 172 and may constitute, for example, a virtual machine file system (VMFS) volume, a directory on network attached storage (e.g., storage array network 164), or a local file system path. Datastores are platform-independent and host-independent. A user is allowed to select which datastore stores VMDK 314 for VM 172 into which container 127 will be placed.

In some embodiments, a storage policy 308 may specify a RAID level that is implemented in the storage device(s) 302 that store VDMK 314 associated with VM 172 that includes the requested container. RAM is a scheme whereby multiple physical disks are used to implement storage redundancy techniques. The RAID level refers to the specific redundancy technique implemented for the physical disks in which VMDKs 314 for VM 172 that executes container 127 are stored. Many different RAID levels are known and are possible. Variations across RAID levels include whether data is "striped" (e.g., split between physical drives) and/or mirrored, whether bit parity is kept, and other aspects.

In some embodiments, a storage policy 308 may specify whether storage deduplication is enabled for a datastore that stores VMDK 314 associated with VM 172 that includes requested container 127. Storage deduplication is a feature that allows for consolidation of duplicated data. With deduplication, multiple, identical instances of data are reduced, for example, to a single instance of that data, resulting in a reduction in storage space used by the data.

In some embodiments, a storage policy 308 may specify whether snapshotting occurs for VMDK 314 associated with VM 172 that includes requested container 127. Storage-array based snapshotting is a feature that allows for the creation of "snapshots" of files associated with VM 172. Snapshots are copies of the files as they exist at a certain point in time In some embodiments, a storage policy 308 may specify the type of VMDK 314 that is associated with VM 172 that includes requested container 127. VMDK type indicates how VMDK 314 associated with VM 172 that includes requested container 127 is to be provisioned. Examples of options include thin provisioning, thick provisioning, and lazy zeroed. Thin provisioning means that space for data for VMDK 314 is only allocated in storage for data that is actually being used (i.e., has been allocated for use). For example, a VMDK 314 may be deemed to have a particular size, but only data for a smaller portion of VMDK 314—data that is actually being used and is not free—is allocated. Thick provisioning allocates all space for VMDK 314 regardless of whether particular data is being used. Lazy zeroing means that data is zeroed (i.e., cleared) only when the space for that data is allocated.

In some embodiments, a storage policy 308 may select the VMDK SCSI controller for VMDK 314 associated with VM 172 that includes requested container. VMDK SCSI controller refers to the controller (e.g., device driver) to be used for VMDK 314. Examples of the controller include an IDE (integrated drive electronics) controller, a SCSI controller, or pvscsi (paravirtual SCSI) controller, developed by VMware. Other controllers are possible.

Network policies 310 dictate user-specified characteristics of the network resources that are to be provided for requested container 127. Network policies 310 include one or more of the following characteristics: the vNIC VM network, the physical network speed, whether physical NICs are teamed, the vNIC type (e.g., whether it is an emulation of a specific device or a virtual device with no physical counterpart), whether the vNIC is connected to a distributed virtual switch or a virtual switch (also a "non-distributed virtual switch"), and settings related to VM network input output control ("NIOC"). More detailed descriptions of the above-mentioned characteristics are provided below.

After placing the requested container in a VM and selecting a VMDK 314, cloud director 152 examines vNICs 129 associated with the VM in which the requested container was placed. If the vNIC 129 meets network policies 310, then cloud director 152 does not modify that vNIC 129. If the vNIC 129 can be reconfigured to meet network policies 310, then cloud director 152 reconfigures vNIC 129 to meet network policies 310. If no vNIC 129 exists that can be configured to meet network policies 310, then cloud director 152 provisions a new vNIC 129 to meet network policies 310.

In some embodiments, a network policy 310 may specify the vNIC VM network for the vNIC used by the VM that includes the requested container. The vNIC VM network specifies the addressing scheme for the private network coupled to the vNIC (e.g., vNIC 129) for the VM into which the container is to be placed. For example, the vNIC VM network may specify that the vNIC is coupled to a 10.x network (i.e., to a private network whose IP addresses begin with "10.") or that the vNIC is coupled to a 192.x network (i.e., to a private network whose IP addresses begin with "192."). A network policy 310 may specify the address range of the private network coupled to the vNIC.

In some embodiments, a network policy 310 may specify the physical network speed of physical network device 304 through which traffic flows for the vNIC associated with the VM in which the container will be placed. In some embodiments, a network policy 310 may specify whether hardware underlying the requested container has physical NIC teaming capabilities. "Physical NIC teaming" specifies whether the physical network device uses NIC teaming, which involves using multiple network devices to form a single link.

In some embodiments, a network policy 310 may specify the vNIC type, which indicates the particular virtual network adaptor implementation that is to be included in the VM that executes the requested container. Examples of vNIC types include "E1000," which is an emulation of the Intel 82545EM Gigabit Ethernet NIC, and "VMXNET." which is a purely virtual network adaptor that has no physical counterpart.

In some embodiments, a network policy 310 may specify whether the vNIC is coupled to a distributed virtual switch ("DVS") or a virtual switch ("vswitch"). A virtual switch acts as a virtual level 2 switch for VMs 172 in hosts 162 and distributed virtual switches provide additional features, such as providing a common set of switch ports across hosts 162 in a data center 180. Both vswitches and DVS's are products available from VMware.

In some embodiments, a network policy 310 may specify aspects related to VM network input/output control ("NIOC"), which refers to a technique for prioritizing network traffic flow to high priority applications if network congestion exists. A network policy 310 may specify the network priority associated with the VM into which the container is to be placed.

When cloud director 152 receives a request to provision a container 127, cloud director 152 obtains a VM 172 that matches the characteristics laid out in the compute policies 306. To do this, cloud director 152 may locate an already existing VM 172. If a VM 172 exists that meets the compute policies related to ails but whose host does not meet the compute policies related to hardware, cloud director 152 may migrate that VM to a host 162 that does meet the policies. If no VMs 172 exist that meet the VM-related policies, cloud director 152 simply provisions a new VM 172, placing it in a host 162 that meets compute policies 306.

After obtaining a VM 172 that meets compute policies 306, cloud director 152 obtains a VMDK 314 to meet storage policies 308. If the selected VM has access to a VMDK 314 that meets storage policies 308, then cloud director 152 simply selects that VMDK 314 for use by the container. If the VM does not have access to such VMDK 314, but a VMDK 314 that meets storage policies 308 exists and can be migrated to be accessible by VM 172, then cloud director 152 migrates that VMDK 314 to be accessed by the VM. If a VMDK 314 that meets storage policies 308 does not exist, then cloud director 152 causes a new VMDK 314 to be added and accessible by the VM.

After obtaining a VMDK 314 that meets storage policies 308, cloud director 152 either reconfigures a vNIC 129 that is included with the obtained VM in order to meet network policies 310 or adds a new vNIC 129 that meets network policies 310. At this point, the container been added in a manner that is consistent with container placement policies 167. In some embodiments, cloud director 152 disables migration of the VM in which the container has been placed, in order to maintain the container in a VM that meets container placement policies 167.

A user may indicate that no requirement exists for any particular characteristic. For example, a user may indicate that, regarding the CPU number characteristic for compute policies 306, no requirement exists. Cloud director 152 would be free to choose a VM 172 having any number of CPUs. In another example, a user may indicate that, regarding the vNIC type characteristic for network policies 310, no requirement exist. Cloud director 152 would be free to use a vNIC 129 of any type.

After placement of a container 127, configuring of VMDK 314, and configuration of vNIC 129, cloud director 152 disables automatic changes to the VM 172, VMDK 314, vNIC 129. Such automatic changes may include VM migration (i.e., moving a VM from one hardware platform to another), VM reconfiguration, VMDK reconfiguration, and/ or vNIC reconfiguration. Disabling automatic changes prevents cloud director 152 from altering the VM, VMDK, and/or vNIC to maintain VM, VMDK, and NIC in compliance with container placement policies 167.

Figure 4:
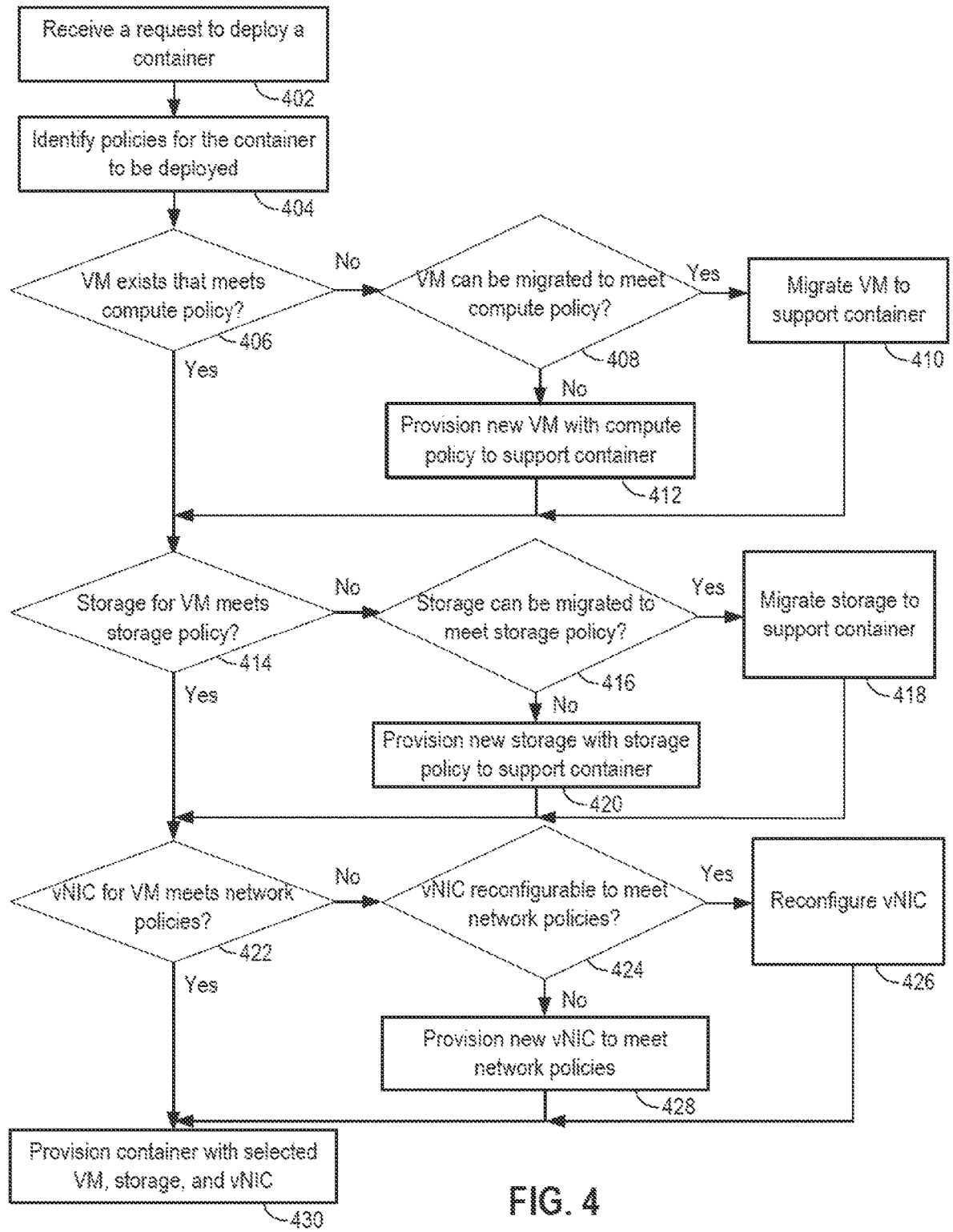
FIG. 4 is a flow diagram that illustrates steps for a method of placing a container into a VM according to container placement policies, according to an example.

FIG. 4 is a flow diagram that illustrates steps for a method 400 of placing a container 127 into a VM 172, according to an example. It should be recognized that, even though the method is described in conjunction with the system of FIGS. 1-3, any system configured to perform the method steps, in any technically feasible order, is within the scope of the present disclosure.

As shown, a method 400 begins at step 402, where cloud director 152 receives a request to deploy a new container 127. At step 404, cloud director 152 identifies container placement policies 167 for placing container 127. At step 406, cloud director 152 determines whether a VM 172 exists that meets the compute policy. If such a VM 172 does not exist, then method 400 proceeds to step 408 and if such a VM 172 does exist, then method 400 proceeds to step 414.

At step 408, cloud director 152 determines whether a VM 172 can be migrated to meet compute policies 306. If such a VM 172 can be migrated, then method 400 proceeds to step 410 and if such a VM 172 does not exist or cannot be migrated, then method 400 proceeds to step 412. At step 410, cloud director 152 migrates a VM 172 to meet the compute policy. At step 412, cloud director 152 provisions a new VM 172 in accordance with compute policies 306 to support the container. After both steps 410 and 412, method 400 proceeds to step 414.

At step 414, cloud director 152 determines whether VM storage (e.g., a VMDK 314) for the selected VM meets the storage policies. If the VM storage for the selected VM does not meet storage policies 308, then method 400 proceeds to step 416 and if VM storage for the selected VM 172 does meet the storage policy, then method 400 proceeds to step 422. At step 416, cloud director 152 determines whether VM storage can be migrated to meet the storage policy. If VM storage can be migrated, then method 400 proceeds to step 418 and if VM storage cannot be migrated, then method 400 proceeds to step 420. At step 418, cloud director 152 migrates VM storage to support container 127. At step 420, cloud director 152 provisions new VM storage according to the storage policy to support container 127. After steps 418 and 420, method 400 proceeds to step 422.

At step 422, cloud director 152 determines whether a vNIC 129 associated with the selected VM meets the network policies. If the vNIC does not meet the network policies, then method 400 proceeds to step 424 and if the vNIC does meet the network policies, then method 400 proceeds to step 430. At step 424, cloud director 152 determines Whether the vNIC is reconfigurable to meet network policies 310. If the vNIC is reconfigurable to meet network policies 310, then method 400 proceeds to step 426 and if the vNIC is not reconfigurable to meet network policies 310, then method 400 proceeds to step 428. At step 426, cloud director 152 reconfigures the vNIC to meet the network policies. At step 428, cloud director 152 provisions a new vNIC to meet the network policies. After both steps 426 and 428, method 400 proceeds to step 430. At step 430, cloud director provisions a container 127 with the selected VM, storage, and vNIC.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com.). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the applications view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations, Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
provisioning a container in a virtual machine (VM) based on container placement policies, wherein provisioning the container in the virtual machine comprises:
identifying the container placement policies for the container to be provisioned, wherein the container placement policies include compute policies, storage policies and network policies;
determining whether an existing VM executing within a data center would be compliant with the compute policies if migrated between physical hosts;
migrating the existing VM so that the existing VM becomes a compliant VM with the compute policies and selecting the compliant VM, as the VM into which the container is placed;
identifying a virtual machine disk file (VMDK) for the VM based on the storage policies;
migrating the VMDK so that the container is placed on storage that is compliant with the storage policies;
identifying a virtual network interface controller (vNIC) for the VM based on the network policies, wherein the network policies specify a VM network for the vNIC to be used by the container;
reconfiguring the vNIC to make it compliant with the network policies; and
provisioning the container with the selected VM, the VMDK and the vNIC.

2. The method of claim 1, wherein the compute policies specify at least one of characteristics of a physical host computer on which the VM executes and configuration characteristics of the VM.

3. The method of claim 1, wherein the storage policies specify at least one of characteristics of a storage device in which the VMDK is stored, characteristics of the VMDK, and characteristics of a data store in which the VMDK is stored.

4. The method of claim 1, wherein the network policies specify at least one of characteristics of the vNIC and characteristics of a physical network device through which network traffic associated with the vNIC flows.

5. The method of claim 1, wherein provisioning the container in the virtual machine comprises:
   if the existing VM would not be compliant with the compute policies if migrated between physical hosts, then provisioning a new VM to meet the compute polices and selecting, as the VM into which the container is placed, the new VM.

6. The method of claim 1, wherein identifying the VMDK comprises:
   determining whether a candidate VMDK associated with the VM meets the storage policies,
   if the candidate VMDK meets the storage policies, then selecting, as the VMDK, the candidate VMDK,
   if the VMDK does not meet the storage policies, then determining whether a semi-compliant VMDK exists that can be migrated to meet the storage policies,
   if a semi-compliant VMDK exists that can be migrated to meet the storage policies, then migrating the semi-compliant VM to form a now-compliant VMDK, and selecting the now-compliant VMDK as the VMDK, and
   if a semi-compliant VMDK does not exist, then provisioning a new VMDK that meets the storage policies and selecting the new VMDK as the VMDK.

7. The method of claim 1, wherein identifying the vNIC comprises:
   determining whether a candidate vNIC associated with the VM exists that meets the network policies,
   if the candidate vNIC exists, then selecting the candidate vNIC as the vNIC,
   if the candidate vNIC does not exist, then determining whether a semi-compliant vNIC associated with the VM would meet the network policies if reconfigured,
   if the semi-compliant vNIC exists, then reconfiguring the semi-compliant vNIC to form a now-compliant vNIC and selecting, as the vNIC, the now-compliant vNIC, and
   if the semi-compliant vNIC does not exist, then provisioning a new vNIC to meet the network policies.

8. The method of claim 1, further comprising:
   disabling migration and reconfiguration of the VM and the VMDK; and
   disabling reconfiguration of the vNIC.

9. The method of claim 1, wherein:
   the compute policies include at least one of a selection between on-premise and off-premise hardware to execute the VM, a CPU family of a host that executes the VM, a non-volatile storage controller type for the host, a type of operating system executed by the VM, a hardware version of the VM, a number of virtual CPUs included within the VM, a selection of whether high availability is enabled for the VM, a selection of whether distributed resource scheduling is enabled for the VM, a selection of whether fault tolerance is enabled for the VM, and an amount of RAM allocated to the VM;
   the storage policies include at least one of a datastore identifier, a redundant array of inexpensive disks (RAID) level of storage for the VM, a selection of whether storage deduplication is enabled for the VM, a selection of whether storage-array based snapshotting is enabled, a type for the VMDK, and a controller type for the VMDK; and
   the network policies include at least one of a selection of private network to which the vNIC is attached, a physical network speed for a physical network interface controller (NIC) that underlies the vNIC, whether physical NIC teaming is enabled for physical NICs associated with the VM, a type of the vNIC, a selection of whether the vNIC is connected to a distributed virtual switch or a non-distributed virtual switch, and settings for VM network input/output control.

10. A system, comprising:
    a cloud director;
    a plurality of hosts executing a plurality of virtual machines (VMs);
    a plurality of storage devices storing a plurality of virtual machine disk files (VDMKs) associated with the VMs; and
    a plurality of network devices supporting a plurality of virtual network interface controllers (vNICs),
    wherein the cloud director is configured to:
    provision a container in a VM of the plurality of VMs based on container placement policies, including:
        identifying the container placement policies for the container to be provisioned, wherein the container placement policies include compute policies, storage policies and network policies;
        determining whether an existing VM executing within a data center would be compliant with the compute policies if migrated between physical hosts;
        migrating the existing VM so that the existing VM becomes a compliant VM with the compute policies and selecting the compliant VM, as the VM into which the container is placed;
        identifying a VMDK of the plurality of VMDKs for the VM based on the storage policies;
        migrating the VMDK so that the container is placed on storage that is compliant with the storage policies; and
        identifying a vNIC of the plurality of vNICs for the VM based on the network policies, wherein the network policies specify a VM network for the vNIC to be used by the container;
        reconfiguring the vNIC to make it compliant with the network policies; and
        provisioning the container with the selected VM, the VMDK and the vNIC.

11. The system of claim 10, wherein the compute policies specify at least one of characteristics of a physical host computer on which the VM executes and configuration characteristics of the VM.

12. The system of claim 10, wherein the storage policies specify at least one of characteristics of a storage device in which the VMDK is stored, characteristics of the VMDK, and characteristics of a data store in which the VMDK is stored.

13. The system of claim 10, wherein the network policies specify at least one of characteristics of the vNIC and characteristics of a physical network device through which network traffic associated with the vNIC flows.

14. The system of claim 10, wherein the cloud director is configured to provision the container in the virtual machine by:
if the existing VM would not be compliant with the compute policies if migrated between physical hosts, then provisioning a new VM to meet the compute polices and selecting, as the VM into which the container is placed, the new VM.

15. The system of claim 10, wherein the cloud director is configured to identify the VMDK by:
determining whether a candidate VMDK associated with the VM meets the storage policies,
if the candidate VMDK meets the storage policies, then selecting, as the VMDK, the candidate VMDK,
if the VMDK does not meet the storage policies, then determining whether a semi-compliant VMDK exists that can be migrated to meet the storage policies,
if a semi-compliant VMDK exists that can be migrated to meet the storage policies, then migrating the semi-compliant VM to form a now-compliant VMDK, and selecting the now-compliant VMDK as the VMDK, and
if a semi-compliant VMDK does not exist, then provisioning a new VMDK that meets the storage policies and selecting the new VMDK as the VMDK.

16. The system of claim 10, wherein the cloud director is configured to identify the vNIC by:
determining whether a candidate vNIC associated with the VM exists that meets the network policies,
if the candidate vNIC exists, then selecting the candidate vNIC as the vNIC,
if the candidate vNIC does not exist, then determining whether a semi-compliant vNIC associated with the VM would meet the network policies if reconfigured,
if the semi-compliant vNIC exists, then reconfiguring the semi-compliant vNIC to form a now-compliant vNIC and selecting, as the vNIC, the now-compliant vNIC, and
if the semi-compliant vNIC does not exist, then provisioning a new vNIC to meet the network policies.

17. The system of claim 10, wherein the cloud director is further configured to:

disable migration and reconfiguration of the VM and the VMDK; and
disable reconfiguration of the vNIC.

18. A non-transitory computer-readable medium storing instructions that, when executed by a processor, cause the processor to perform a method, the method comprising:
provisioning a container in a virtual machine (VM) based on container placement policies, wherein provisioning the container in the virtual machine comprises:
identifying the container placement policies for the container to be provisioned, wherein the container placement policies include compute policies, storage policies and network policies;
determining whether an existing VM executing within a data center would be compliant with the compute policies if migrated between physical hosts;
migrating the existing VM so that the existing VM becomes a compliant VM with the compute policies and selecting the compliant VM, as the VM into which the container is placed;
identifying a virtual machine disk file (VMDK) for the VM based on the storage policies;
migrating the VMDK so that the container is placed on storage that is compliant with the storage policies;
identifying a virtual network interface controller (vNIC) for the VM based on the network policies, wherein the network policies specify a VM network for the vNIC to be used by the container;
reconfiguring the vNIC to make it complaint with the network policies; and
provisioning the container with the selected VM, the VMDK and the vNIC.

19. The non-transitory computer-readable medium of claim 18, wherein the compute policies specify at least one of characteristics of a physical host computer on which the VM executes and configuration characteristics of the VM.

20. The non-transitory computer-readable medium of claim 18, wherein the storage policies specify at least one of characteristics of a storage device in which the VMDK is stored, characteristics of the VMDK, and characteristics of a data store in which the VMDK is stored.

* * * * *